(12) United States Patent
Alvarez

(10) Patent No.: US 11,348,073 B2
(45) Date of Patent: May 31, 2022

(54) METHOD AND SYSTEM FOR REMOTE MANAGEMENT OF APPOINTMENT DATA

(71) Applicant: VARANIDEA, LLC, Memphis, TN (US)

(72) Inventor: Esteban Alvarez, New York, NY (US)

(73) Assignee: VARANIDEA, LLC., Memphis, TN (US)

( * ) Notice: Subject to any disclaimer, the term of this patent is extended or adjusted under 35 U.S.C. 154(b) by 20 days.

(21) Appl. No.: 16/442,886

(22) Filed: Jun. 17, 2019

(65) Prior Publication Data

US 2019/0303881 A1   Oct. 3, 2019

Related U.S. Application Data

(63) Continuation of application No. 14/744,793, filed on Jun. 19, 2015, now Pat. No. 10,373,122.

(60) Provisional application No. 62/157,127, filed on May 5, 2015.

(51) Int. Cl.
   *G06Q 10/10*   (2012.01)

(52) U.S. Cl.
   CPC .............................. *G06Q 10/1095* (2013.01)

(58) Field of Classification Search
   CPC ............. G06Q 10/1095; G06Q 10/109; G06Q 10/06314; G06Q 10/1093
   See application file for complete search history.

(56) References Cited

U.S. PATENT DOCUMENTS

| | | | | |
|---|---|---|---|---|
| 7,108,173 B1 * | 9/2006 | Wang | ...................... | G06Q 10/02 235/377 |
| 8,712,820 B2 * | 4/2014 | Gingras | .............. | G06Q 10/1093 705/7.18 |
| 2004/0064355 A1 * | 4/2004 | Dorenbosch | ....... | G06Q 10/1095 705/7.19 |
| 2005/0102245 A1 | 5/2005 | Edlund | | |
| 2005/0267975 A1 * | 12/2005 | Qureshi | ................ | H04L 63/105 709/229 |
| 2006/0200374 A1 * | 9/2006 | Nelken | ................ | G06Q 10/109 705/7.19 |

(Continued)

OTHER PUBLICATIONS

Written Opinion issued by the International Search Authority dated Aug. 8, 2016 in corresponding PCT Application No. PCT/US2016/029422 (6 pages).

*Primary Examiner* — Renae Feacher
(74) *Attorney, Agent, or Firm* — Buchanan Ingersoll & Rooney PC

(57) ABSTRACT

A method for remote management of appointment data includes: receiving appointment data including a time range, an originating user identifier, invitee user identifiers, and an appointment length; identifying an originating user data entry that includes the originating user identifier and invitee user data entries that include the invitee user identifiers; transmitting a calendar data request to the respective associated calendar provider for each calendar data entry included in the originating and invitee user data entries; receiving calendar data for each calendar data entry that includes availability in the time range; identifying an appointment time having a highest availability of invitees based on received availability; and transmitting the appointment time, for each calendar data entry included in the originating and invitee user data entries, to the associated calendar provider.

16 Claims, 6 Drawing Sheets

(56) References Cited

U.S. PATENT DOCUMENTS

| | | | | |
|---|---|---|---|---|
| 2006/0277282 | A1* | 12/2006 | Christensen | H04L 67/2819 709/223 |
| 2006/0293943 | A1* | 12/2006 | Tischhauser | G06Q 10/06314 705/7.24 |
| 2008/0015922 | A1* | 1/2008 | Nelken | G06Q 10/109 705/7.19 |
| 2010/0306824 | A1* | 12/2010 | Gurney | G06Q 10/109 726/4 |
| 2011/0071878 | A1* | 3/2011 | Gingras | G06Q 10/1093 705/7.18 |
| 2013/0290058 | A1* | 10/2013 | Gray | G06Q 10/1095 705/7.19 |
| 2014/0229560 | A1* | 8/2014 | Gray | H04L 12/1818 709/206 |
| 2014/0358614 | A1 | 12/2014 | Grover et al. | |

* cited by examiner

METHOD AND SYSTEM FOR REMOTE MANAGEMENT OF APPOINTMENT DATA

RELATED APPLICATIONS

The present application is a continuation of U.S. application Ser. No. 14/744,793, filed on Jun. 19, 2015, which claims the benefit of U.S. Provisional Application No. 62/157,127, entitled "Method and System for Remote Management of Appointment Data," by Esteban Alvarez, filed on May 5, 2015, which is herein incorporated by reference in its entirety.

FIELD

The present disclosure relates to the remote management of appointment data, specifically the management of appointment data across multiple calendars and calendar services for multiple users for the automatic identification of suitable appointment times for a range of dates, users, and calendars.

BACKGROUND

Many people use calendars provided by various calendar services to manage their time. In a number of instances, calendar users may have multiple calendars, with each calendar being used for different types of tasks, such as one calendar for work tasks and appointments, another calendar for personal tasks and appointments, and yet another calendar that may be shared with another person. It may be difficult for such users to manage their calendars and make new appointments, particularly if each calendar is managed using a different service. This problem may be compounded if a user is attempting to set an appointment or event with other users, each of whom may suffer from the same issues.

Some services may offer the ability for a user to view the calendar of other users, and may even provide for time availability on a selected day, that the primary user may use to select a time for an event. However, this may only provide helpful data for the specific selected day. In instances where each of the users may be unavailable on some days, the primary user may have to go from day to day to day, viewing the time availability in order to find a suitable time. In addition, the information may only be suitable for those calendars the primary user has been provided access to, which may require a number of steps by each of the other users. This may be both inconvenient to the other users as well as an overstep on the users' privacy, as they may not want calendar details shared. On top of all of this, if the other users have calendars on different services, that information may be unknown to the primary user and the service they are using to create the appointment.

Thus, there is a need for a technical system that can provide for the management of appointment data for multiple calendars for multiple users, which may enable the creation of appointments during a range of dates and times based on availability for each of the users and across each of their associated calendars.

SUMMARY

The present disclosure provides a description of systems and methods for remote management of appointment data.

A method for remote management of appointment data includes: storing, in a database of a processing server, a plurality of user data entries, wherein each user data entry includes data related to a user including at least a user identifier and one or more calendar data entries, each calendar data entry including data related to a calendar including at least a calendar identifier and an associated calendar provider; receiving, by a receiving device of the processing server, appointment data from a computing device, wherein the appointment data includes at least a time and/or date range, an originating user identifier, a plurality of invitee user identifiers, and an appointment length; executing, by a processing device of the processing server, a query on the database of the processing server to identify an originating user data entry stored in the database where the included user identifier corresponds to the originating user identifier and a plurality of invitee user data entries where each invitee user data entry includes a user identifier corresponding to one of the plurality of invitee user identifiers; transmitting, by a transmitting device of the processing server, a calendar data request for each calendar data entry included in the originating user data entry and each of the plurality of invitee user data entries, wherein the calendar data request includes at least the calendar identifier included in the respective calendar data entry and is transmitted to the associated calendar provider included in the respective calendar data entry; receiving, by the receiving device of the processing server, calendar data for each calendar data entry included in the originating user data entry and each of the plurality of invitee user data entries in response to the transmitted calendar request, wherein the calendar data includes at least an indication of availability of an associated user at each time and/or date of a plurality of times and/or dates; identifying, by the processing device of the processing server, at least one appointment time having a highest availability of invitees using one or more algorithms applied to the received calendar data, based on at least a correspondence between the indication of availability for each time and/or date of the plurality of times and/or dates and the time and/or date range and appointment length for each calendar data entry, wherein the one or more algorithms are configured to maximize availability of associated users; and transmitting, by the transmitting device of the processing server, one of the at least one identified appointment time, for each calendar data entry included in the originating user data entry and each of the plurality of invitee user data entries, to the associated calendar provider included in the respective calendar data entry.

A system for remote management of appointment data includes a database, a receiving device, a processing device, and a transmitting device of a processing server. The database is configured to store a plurality of user data entries, wherein each user data entry includes data related to a user including at least a user identifier and one or more calendar data entries, each calendar data entry including data related to a calendar including at least a calendar identifier and an associated calendar provider. The receiving device is configured to receive appointment data from a computing device, wherein the appointment data includes at least a time and/or date range, an originating user identifier, a plurality of invitee user identifiers, and an appointment length. The processing device is configured to execute a query on the database of the processing server to identify an originating user data entry stored in the database where the included user identifier corresponds to the originating user identifier and a plurality of invitee user data entries where each invitee user data entry includes a user identifier corresponding to one of the plurality of invitee user identifiers. The transmitting device is configured to transmit a calendar data request for each calendar data entry included in the originating user data entry and each of the plurality of invitee user data entries, wherein the calendar data request includes at least the calendar identifier included in the respective calendar data entry and is transmitted to the associated calendar provider included in the respective calendar data entry. The receiving device is further configured to receive calendar data for each calendar data entry included in the originating user data entry and each of the plurality of invitee user data entries in response to the transmitted calendar request, wherein the calendar data includes at least an indication of availability of an associated user at each time and/or date of a plurality of times and/or dates. The processing device is further configured to identify at least one appointment time having a highest availability of invitees using one or more algorithms applied to the received calendar data, based on at least a correspondence between the indication of availability for each time and/or date of the plurality of times and/or dates and the time and/or date range and appointment length for each calendar data entry, wherein the one or more algorithms are configured to maximize availability of associated users. The transmitting device is further configured to transmit one of the at least one identified appointment time, for each calendar data entry included in the originating user data entry and each of the plurality of invitee user data entries, to the associated calendar provider included in the respective calendar data entry.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 6:
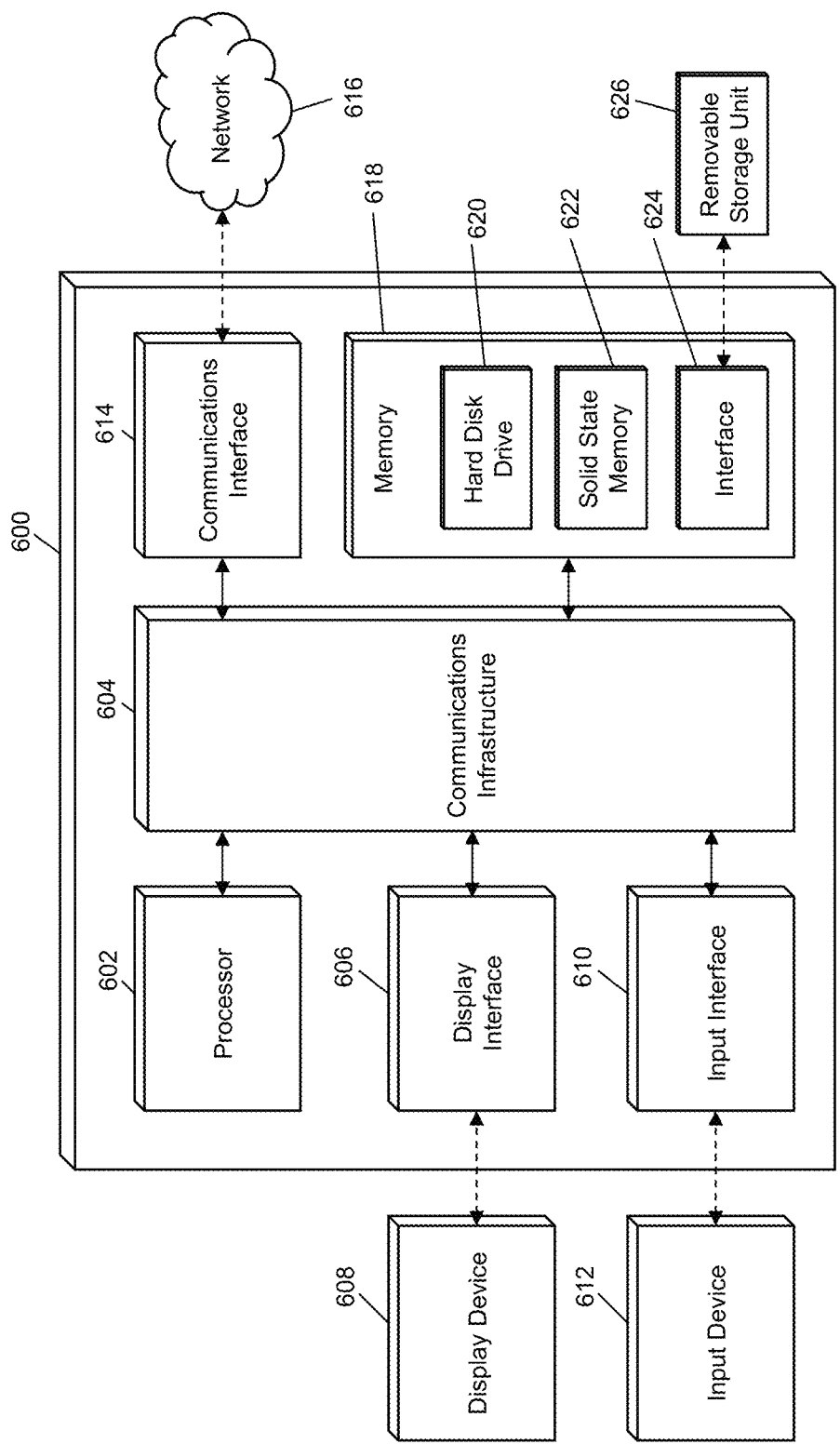

FIG. 6 is a block diagram illustrating a computer system architecture in accordance with exemplary embodiments Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Figure 1:
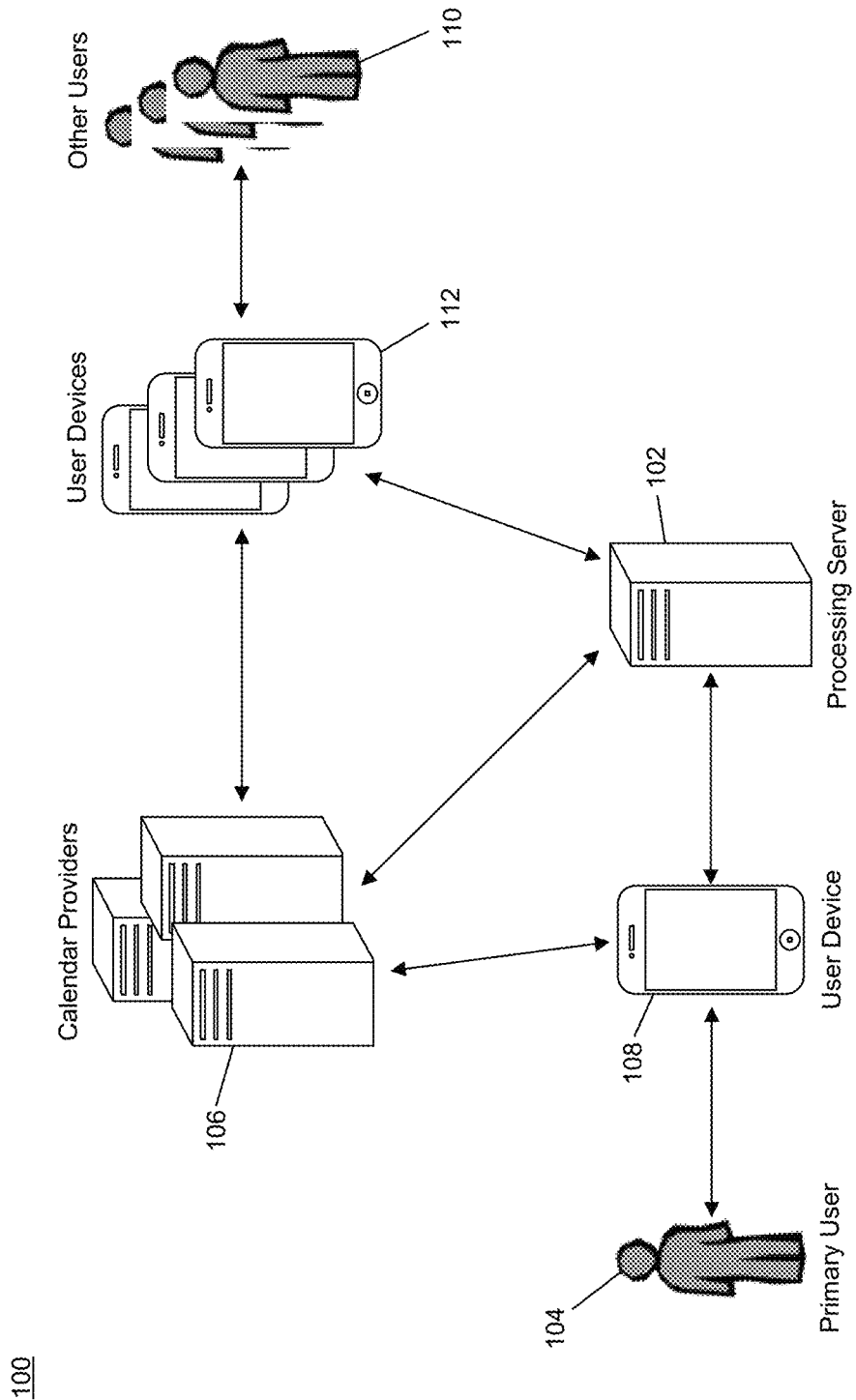
FIG. 1 is a block diagram illustrating a high level system architecture for remote management of appointment data in accordance with exemplary embodiments.

FIG. 1 illustrates a system 100 for the remote management of appointment data.

The system 100 may include a processing server 102. The processing server 102, discussed in more detail below, may be configured to remotely manage appointment data for a plurality of users across a plurality of calendars. In the system 100, a primary user 104 may have two or more calendars that are registered with, managed by, or otherwise associated with one or more calendar providers 106. Calendar providers 106 may be entities, services, software programs, etc. configured to provide users with a calendar for use in managing appointment data. For example, calendar providers 106 may include Microsoft®, Google®, Apple®, Facebook®, etc., which may provide users with calendars via Microsoft® Outlook®, Google® Calendar, iCal®, and Facebook® Events, respectively. The primary user 104 may have multiple calendars with a single calendar provider 106, may have single calendars each with a different calendar provider 106, or a combination thereof.

The primary user 104 may access and manage their calendars via one or more user devices 108. User devices 108 may include any suitable type of computing device including a desktop computer, laptop computer, notebook computer, tablet computer, cellular phone, smart phone, smart watch, smart television, entertainment console, wearable computing device, implantable computing device, etc. In some instances, a single calendar may be accessible via multiple user devices 108, such as in instances where appointment data is stored at the respective calendar provider 106.

The system 100 may also include a plurality of other users 110. Each of the other users 110 may use associated user devices 112 to access and manage their own calendars with the various calendar providers 106. In the system 100, the primary user 104 may wish to create a new appointment with the other users 110.

In traditional systems, the primary user 104 would first have to request permission to view the calendars of each other user 110 via each of the calendar providers 106 being used by the primary user 104. If an other user 110 uses a calendar provider 106 not in use by the primary user 104, the primary user 104 must register for a calendar with the calendar provider 106, or not be apprised to appointment information by that other user 110 on their calendar with the respective calendar provider 106. Each other user 110 must then provide access to their appointment data on their respective calendars to the primary user 104. The primary user 114 would then use each calendar provider 106 to view each of the calendars of the other users 110 and manually determine what may be a suitable date and/or time, by checking each date and/or time individually. In instances where a calendar provider 106 may provide suitable times on a select day, the primary user 104 may be able to take advantage of such a feature, but must repeat the process for each calendar provider 106, and must do so for additional days if the first selected day ends up being unsuitable. Thus, in a traditional system, it may require significant time and effort for the primary user 104 to create an appointment with the other users 110, and only if the calendar providers 106 being used are able to (and the other users 110 provide permission for) provide the primary user 104 with access to the appointments of the other users 110.

The processing server 102 may provide for significant technological improvements by interfacing and communicating with each of the calendar providers 106 on behalf of each of the users in the system 100. The primary user 104 and each of the other users 110 may register with the processing server 102 using their user devices 108 and 112, respectively. Registration may include providing the processing server 102 with suitable data regarding each of the calendars used by the users with the various calendar providers 106. Suitable data may include identification data and any credentials that may be required for access to the respective calendars, such as usernames, passwords, etc. The processing server 102 may store the data for each user in a database, discussed in more detail below. The data may be stored in any suitable format using any suitable configuration, such as storing the data in separate profiles for each user in a relational database.

The primary user 104 may use their user device 108 to access the processing server 102, such as via an application program executed by the user device 108 and configured to communicate with the processing server 102, such as a specially configured application program or a web browsing program configured to access a web page associated with the processing server 102. The primary user 104 may then enter information for the request of an appointment. The information may include a range of dates and times, information about the appointment (e.g., length, title, description, geographic location, etc.), and identification of each of the other users 110 invited to the appointment. The processing server 102 may use the information and may query internal databases to identify the calendars for each of the indicated other users 110 and request calendar data from each of the respective calendar providers 106. The calendar providers 106 may provide the calendar data to the processing server 102.

The processing server 102 may then execute specially configured algorithms that are designed to identify one or more optimal times during the user-provided range of dates and times for the appointment, based on the availability of each of the other users 110 and the primary user 104 across each user's respectively calendars. In instances where there may be no specific date or time where every single user is available, the processing server 102 may identify dates and times where the most users are available. The processing server 102 may provide this information to the primary user 104, who may decide to select a date and time for confirmation. In some instances, the primary user 104 may provide a preferred date and time that may be automatically confirmed if available. In additional instances, the processing server 102 may proceed without confirmation in some cases, such as if each invited user is available for an identified date and time.

Once the event is confirmed, the processing server 102 may store data regarding the event in an internal database and may send invites to each of the other users 110. The other users 110 may accept or deny the invite using their respective user device 112, and the processing server 102 may store data accordingly. In instances where an other user 110 accepts, the processing server 102 may communicate with the calendar providers 106 associated with the other user 110 to block off, or otherwise make unavailable, the time of the event for the other user 110 for each of the calendars. In some instances, the processing server 102 may provide event information. In other instances, the processing server 102 may merely indicate that the other user 110 is unavailable.

In some embodiments, the processing server 102 may be configured to provide additional functions for the registration of an appointment. For instance, if the primary user 104 selects a specific venue for the appointment, the processing server 102 may be configured to contact the venue and reserve the date and time for the appointment. The contact may be performed via any suitable communication, such as the transmission of data message to the venue, or use of an application programming interface to a platform provided by the venue or provided by a third party and associated with the venue. For example, the primary user 104 may make an appointment for a dinner at a restaurant with the other users 110. The processing server 102 may be configured to place a reservation for the date and time with the restaurant as part of the appointment creation, so that the primary user 104 will not have to do so.

In some embodiments, the processing server 102 may be configured to aggregate stored data regarding events. For instance, the processing server 102 may aggregate event data for events as a whole, for individual users, for groups of users, etc. The aggregate data may be used and analyzed by the processing server 102 for use in performing additional functions. For instance, the processing server 102 may identify a group of users that frequent a restaurant. If one user cancels a reservation at the restaurant, the processing server 102 may contact one of the frequent users and notify them of the cancellation, and ask if they would like to take the reservation. In another example, a venue may indicate an opening to the processing server 102, which may then identify users that may be interested in the venue, based on stored data. The venue may then contact the identified users regarding availability. In some instances, such information may only be stored and/or used with consent of the associated users. In other instances, the processing server 102 may only aggregate and/or store data anonymously, such that no individual user is personally identifiable via the information. For instance, the processing server 102 may aggregate data for a group of users of such a size that no individual user is identifiable, but where the data may still be valuable for the processing server 102 or a third party.

In some instances, the processing server 102 may be configured to provide warnings, alerts, and notifications based on event data. For instance, the processing server 102 may notify a user of an upcoming event, such as based on time, based on a geographic location of the user (e.g., approaching an area where the event is being held), etc. Methods and systems for providing event notifications to a user will be apparent to persons having skill in the relevant art.

In some embodiments, the processing server 102 may locally store calendar data for individual users. In other embodiments, the processing server 102 may only store appointment data for appointments involving one or more users, and may not store appointment data associated with individual calendars of a user. For instance, the processing server 102 may, when querying data from the calendar providers 106, use the data provided by the calendar providers 106 for the creation of a new appointment, but may discard the data provided by the calendar providers 106 once the new appointment is created.

Processing Server

Figure 2:
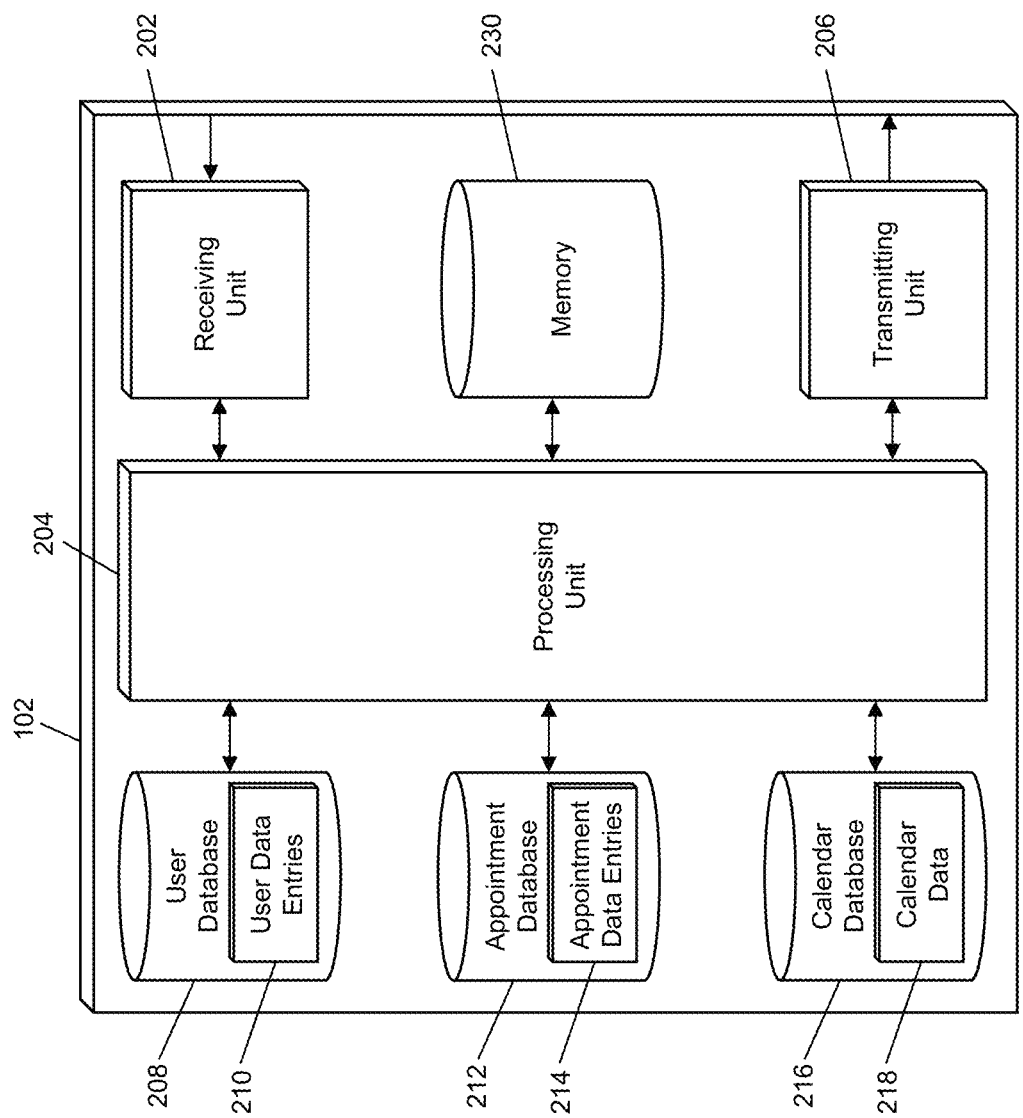
FIG. 2 is a block diagram illustrating a high level architecture of the processing server of FIG. 1 for remote management of appointment data in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving unit 202. The receiving unit 202 may be configured to receive data over one or more networks via one or more network protocols. The receiving unit 202 may receive registration data from one or more users 104, such as via user devices 108, which may be transmitted by any suitable network and protocol, such as using the Internet, a cellular communication network, a local area network, near field communication, Bluetooth, etc. The receiving unit 202 may also receive calendar and/or availability data from one or more calendar providers 106, such as regarding a user's availability during a specific time and/or date range.

The receiving unit 202 may also receive an appointment request, such as from a user device 108, requesting an appointment. The appointment request may include at least a time and/or date range, an identifier associated with the requesting user (e.g., the primary user 104), identifiers associated with each invited other user 110, and an appointment length. The appointment request may also include additional information associated with the appointment, such as a title, description, geographic location, data attachments, images, etc. In some embodiments, the receiving unit 202 may also be configured to receive data from one or more third parties, such as a venue at which an appointment is requested, a data service requesting data regarding appointments, a location service providing a geographic location of a user device 108 for alerts and notifications, etc.

The processing server 102 may also include a processing unit 204. The processing unit 204 may be configured to perform the functions of the processing server 102 discussed herein as will be apparent to persons having skill in the relevant art. The processing server 102 may be configured to store registration data received by the receiving unit 202 in a user database 208 of the processing server 102. The user database 208, discussed in more detail below, may include a plurality of user data entries 210. Each user data entry 210 may include data related to a user (e.g., the primary user 104, other users 110, etc.) including identification information and calendar data for one or more calendars associated with the related user.

When the receiving unit 202 receives an appointment request, the processing unit 204 may be configured to query the user database 208 to identify a user data entry 210 associated with the primary user 104 and a user data entry 210 associated with each of the invited other users 110 based on correspondences between the identifiers included in the respective user data entries 210 and the identifiers included in the received appointment request.

The processing server 102 may further include a transmitting unit 206. The transmitting unit 206 may be configured to transmit data over one or more networks via one or more network protocols. The transmitting unit 206 may transmit data to user devices 108 and 112 via the Internet, local area networks, cellular communication networks, near field communication, Bluetooth, etc., and may also transmit data to calendar providers 106 and other entities via one or more suitable networks. When user data entries 210 are identified for the making of an appointment, the transmitting unit 206 may be configured to transmit calendar data requests to one or more calendar providers 106 to request data for calendars associated with the primary user 104 and each of the invited other users 110. Calendar data requests may include calendar identifying information and, in some instances, user credentials, which may be included in the respective user data entries 210, as discussed in more detail below. In some instances, the calendar data requests may request user availability only during the time and/or date range included in the received appointment request.

In response to the transmitting calendar data requests, the receiving unit 202 may receive calendar data from the calendar providers 106. The calendar data may comprise indications of availability for each related user for the associated calendar at each of a plurality of times and/or dates, which may comprise at least the time and/or date range of the requested appointment. The processing unit 204 may be configured to apply one or more algorithms to the received calendar data in order to identify at least one appointment time. The identified appointment time(s) may have the highest availability of invited other users 110 based on the indications of availability for each of the calendars of each of the invited other users 110.

In some instances, each of the identified appointment times may be ones where the primary user 104 is indicated as available for each of their associated calendars. In some cases, the identified appointment times may be ones in which all invited other users 110 are available. In instances where there may be no such times, the algorithms used to identify appointment times may be optimized to identify times at which a maximum number of invited users are available. In such instances, multiple appointment times may be identified for various combinations of the maximum number of invited users. For example, the primary user 104 may invite four users, user A, user B, user C, and user D, to an appointment. There may be no time at which all four users are available, but the processing unit 204 may identify multiple times at which a combination of three users are available, such as a first time at which user A, user B, and user C are available, a second time at which user A, user C, and user D are available, and a third time at which user B, user C, and user D are available.

In some embodiments, the processing server 102 may be configured to request confirmation of an appointment time from the primary user 104. In some instances, confirmation may be requested and/or waived during the requesting of the appointment by the primary user 104, as indicated in the received appointment request. If confirmation is requested, the transmitting unit 206 may transmit the identified appointment time to the user device 108, and the receiving unit 202 may receive confirmation from the primary user 104. If multiple appointment times are identified, each may be transmitted to the user device 108, with the receiving unit 202 receiving a single, selected time from the primary user 104.

Once an appointment time is confirmed, or if confirmation is not required, the processing unit 204 may be configured to block the availability of the primary user 104 in their associated calendars. This may be accomplished by instructing the transmitting unit 206 to transmit the appointment time to each calendar provider 106 that has a calendar associated with the primary user 104. Each calendar provider 106 may then store data indicating that the primary user 104 is no longer available at the appointment time. In some instances, the calendar providers 106 may be provided with data for the creation of the appointment, such as the title, description, etc. provided by the primary user 104 in the appointment request.

The transmitting unit 206 may also be configured to transmit the identified appointment time to calendar providers 106 associated with each calendar for the invited other users 110. In some embodiments, each of the other users 110 may first be required to accept or deny a request to make the appointment, where the request may include at least the appointment time and any additional information included in the appointment request. In such embodiments, the transmitting unit 206 may be configured to transmit the associated data to the associated user devices 112, and the receiving unit 202 may be configured to receive approval and/or denial information from the respective user devices 112. The transmitting unit 206 may then transmit out the appointment time to the calendar providers 106 for other users 110 who approve the appointment. In some instances, the appointment time may be transmitted to each calendar provider 106 without confirmation from the other users 110, with each calendar provider 106 requesting confirmation from the associated other user 110 independently.

In some embodiments, the transmitting unit 206 may also be configured to transmit data to individuals that are not other users 110 of the processing server 102. In such instances, a primary user 104 may create an appointment that invites individuals that are not users of the services provided by the processing server 102. The processing unit 204 may identify an appointment time based on availability data for users for which such data is available (e.g., the other users 110), which may be confirmed by the primary user 104. The transmitting unit 206 may then transmit appointment notifications to the individuals that are not other users 110, such as via short messaging service message, multimedia message service message, e-mail, etc. In such cases, the individuals may be informed of the appointment even if their calendar data is not registered with the processing server 102. In some instances, the transmitting unit 206 may be further configured to transmit appointment updates and other information to the individuals.

The processing server 102 may also include a memory 230. The memory 230 may be configured to store data suitable for performing the functions discussed herein. The memory 230 may be configured to store algorithms configured to identify appointment times of highest availability, which may be configured to maximize availability of users based on available calendar data; communication protocols and standards for communicating with calendar providers 106, user devices 108 and 112, etc.; aggregated data regarding user appointments, user attendance, appointment locations, appointment types, etc.; data formatting standards and algorithms, etc. Additional data that may be stored in the memory 230 will be apparent to persons having skill in the relevant art.

In some embodiments, the processing server 102 may be configured to store data associated with appointments made by users 104. In such embodiments, the processing server 102 may include an appointment database 212. The appointment database 212 may be configured to store a plurality of appointment data entries 214. Each appointment data entry 214 may be configured to store data related to an appointment, and may include at least the appointment time, appointment length, an identifier associated with the primary user 104, an identifier associated with one or more invited other users 110, attendance data, and any other appointment information included in the associated appointment request.

In some instances, the processing server 102 may also be configured to store calendar data for one or more calendars for users 104 and 110. For example, the processing server 102 may operate as a calendar provider 106. In such instances, the processing server 102 may include a calendar database 216. The calendar database 216 may be configured to store calendar data 218. The calendar data 218 may include data related to calendar of a user, including appointment data, availability data, etc. In some instances, the calendar database 216 may be combined with another database. For example, the user database 208 may include calendar data 218 for each user in the respective user data entry 210. In another example, the calendar data 218 may include appointment data entries 214 for appointments involving the associated user. Additional configurations for data storage in the processing server 102 will be apparent to persons having skill in the relevant art.

The components of the processing server 102 may also be further configured to perform additional functions of the processing server 102 discussed herein, as will be apparent to persons having skill in the relevant art. For instance, in embodiments where the processing server 102 may be configured to notify a venue of an appointment, the components of the processing server 102 may be configured to perform the function, such as by the processing unit 204 identifying the venue corresponding to a received appointment request and the transmitting unit 206 transmitting a notification to the venue of the appointment. In another example, in embodiments where the processing server 102 may provide notifications to users, the receiving unit 202 may receive geographic location information for users, the processing unit 204 may determine travel times and distances for users, and the transmitting unit 206 may transmit notifications to users of upcoming appointments, times when the users should leave for an appointment, etc.

User Database

Figure 3:
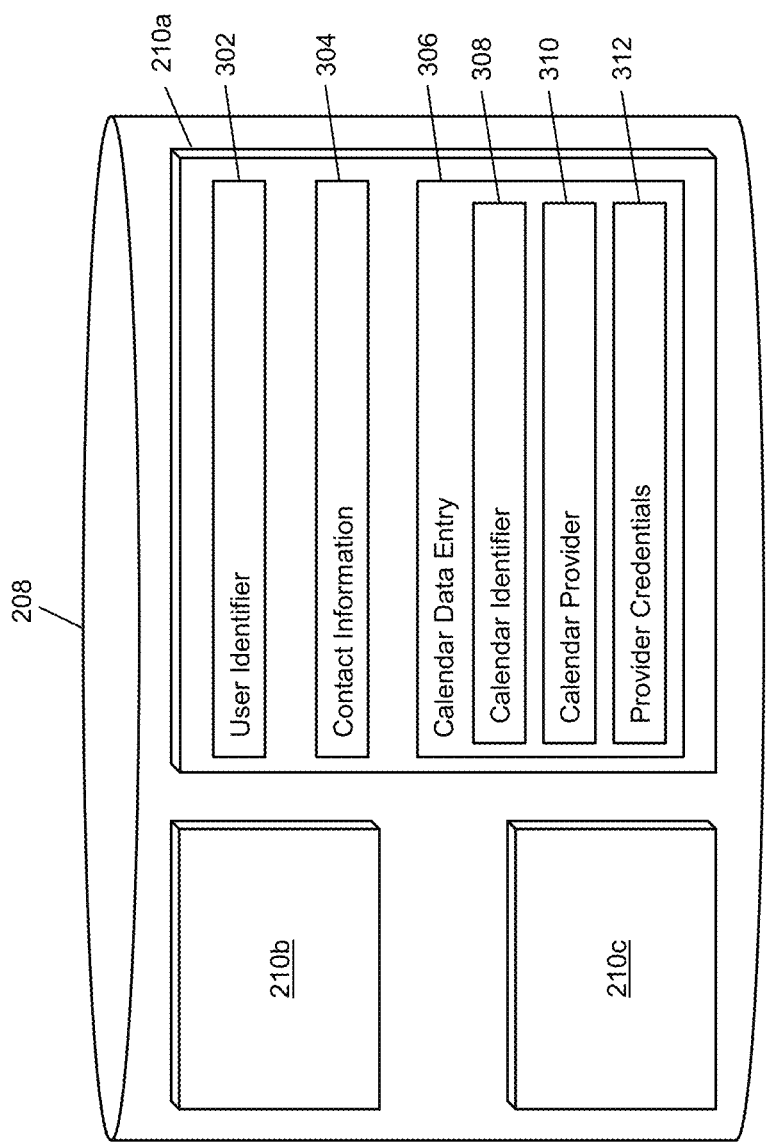
FIG. 3 is a block diagram illustrating an architecture of the user database of the processing server of FIG. 2 for storing user calendar data in accordance with exemplary embodiments.

FIG. 3 illustrates an embodiment of the user database 208 of the processing server 102 for the storage of user data entries 210 associated with users 104 and 110.

As discussed above, the user database 208 may be configured to store a plurality of user data entries 210, illustrated in FIG. 3 as user data entries 210a, 210b, and 210c. Each user data entry 210 may be configured to store data related to a user 104 and/or 110, including at least a user identifier 302, contact information 304, and one or more calendar data entries 306. The user identifier 302 may be a unique value associated with the related user suitable for use in identification of the related user and/or the respective user data entry 210. The user identifier 302 may be, for example, an identification number, username, e-mail address, telephone number, device identifier, or any other suitable value.

The contact information 304 may include data suitable for use by the processing server 102 in contacting the associated user. For example, the contact information may include a username for contacting the user via a web page or application program, a device identifier (e.g., media access control address, Internet Protocol address, phone number, e-mail address, registration number, serial number, etc.) associated with a user device 108 associated with the related user, telephone number, e-mail address, street address, etc. In some embodiments, the contact information 304 and user identifier 302 may be the same value. In some such instances, the user data entry 210 may only include the user identifier 302, which may be used as contact information by the processing server 102.

Each calendar data entry 306 may include data related to a calendar associated with the related user. In some instances, a user data entry 210 may include a single calendar data entry 306. In other instances, a user data entry 210 may include two or more calendar data entries 306. Each calendar data entry 306 may include at least a calendar identifier 308 and a calendar provider 310. The calendar provider 310 may be information associated with the calendar provider 106 associated with the related calendar, such as an identifier, communication information, etc. In some instances, a user data entry 210 may include two or more calendar data entries 306 that include a common calendar provider 310. In some cases, a user data entry 210 may include two or more calendar data entries 306 that include two different calendar providers 310.

The calendar identifier 308 may be a value associated with the related calendar suitable for use by the associated calendar provider 310 for identification of an associated calendar. The calendar identifier 308 may be, for instance, an identification number, a name, etc. In some instances, the calendar identifier 308 may be a unique value. In other instances, the calendar identifier 308 may be unique when combined with another value, such as the user identifier 302 of the related user, a user identifier associated with the calendar provider 310 for the related user, etc. In some embodiments, the calendar identifier 308 may be comprised of multiple values that are suitable for use by the associated calendar provider 310 for identification, such as a username and calendar identification number.

In some embodiments, a calendar data entry 306 may include provider credentials 312. A calendar data entry 306 may include provider credentials 312 in instances where the associated calendar provider 310 requires authentication to access calendar data for the associated calendar. In such instances, the provider credentials 312 may include credentials necessary for authentication as required by the calendar provider 310, such as a password, identification number, username, biometric data, etc., or a combination thereof. In such embodiments, when the processing server 102 is requesting calendar data for the associated calendar, the calendar data request transmitted by the transmitting unit 206 may include the provider credentials 312, which may be used by the calendar provider 106 for authentication of the processing server 102 as being authorized to receive availability data for the associated calendar. The provider credentials 312 may be provided by the associated user during registration with the processing server 102.

Process for Management of Appointment Data

Figure 4:
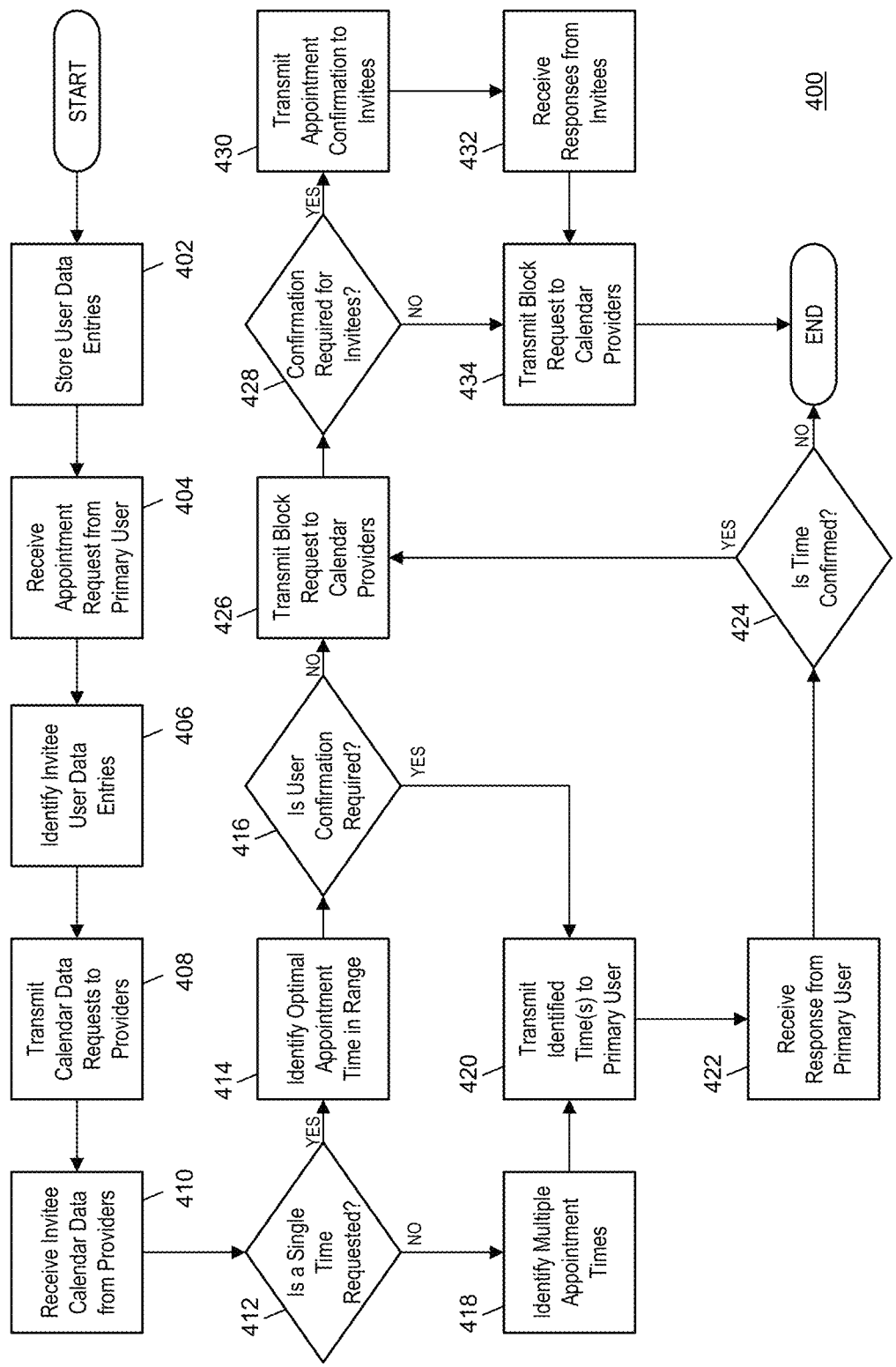
FIG. 4 is a flow diagram illustrating a process for remote management of appointment data using the processing server of FIG. 2 in accordance with exemplary embodiments.

FIG. 4 illustrates a process 400 for the remote management of appointment data in the system 100 using the processing server 102.

In step 402, the processing unit 204 of the processing server 102 may store user data entries 210 in the user database 208 for a plurality of users. Each user data entry 210 may include at least a user identifier 302 and one or more calendar data entries 306, each calendar data entry 306 including at least a calendar identifier 308 and a calendar provider 310. In step 404, the receiving unit 202 of the processing server 102 may receive an appointment request from a primary user 104 via a user device 108. The appointment request may include at least a user identifier 302 associated with the primary user 104, a plurality of invitee user identifiers 302 associated with invited other users 310, an appointment length, and a time and/or date range for which the associated appointment is requested. The appointment request may also include any suitable additional data, such as title, description, image, etc. for the appointment, user preferences regarding confirmation and times, additional requests (e.g., notifications), etc.

In step 406, the processing unit 204 may execute a query on the user database 208 to identify an invitee user data entry 210 associated with each of the invited other users 110. Each invitee user data entry 210 may be identified based on a correspondence between an invitee user identifier 302 included in the received appointment request and the user identifier 302 included in the respective user data entry 210. Step 406 may also include the execution of a query on the user database 208 for identification of an originating user data entry 210 associated with the primary user 104, which may be identified based on a correspondence between the user identifier 302 associated with the primary user 104 and the user identifier 302 included in the user data entry 210.

In step 408, the transmitting unit 206 of the processing server 102 may transmit a calendar data request to calendar providers 106. A calendar data request may be transmitted for each calendar data entry 306 included in each of the identified invitee user data entries 210, and for each calendar data entry 306 included in the originating user data entry 210. The calendar data request may include at least the calendar identifier 308 included in the respective calendar data entry 306 and may be transmitted to the calendar provider 106 associated with the calendar provider indication 310 included in the respective calendar data entry 306. The calendar data request may also include provider credentials 312 where applicable.

In some embodiments, the calendar data request may include the appointment length included in the received appointment request, such as for use in identifying availability of users for the length of time of the appointment. In some instances, the calendar data request may also include the time and/or date range included in the appointment request, which may be used by the calendar providers 106 to narrow the calendar data identified for use in determining availability.

In step 410, the receiving unit 202 may receive calendar data from the calendar providers 106. Calendar data may be received in response to each transmitted calendar data request, and may include an indication of availability for a plurality of times and/or dates as indicated in the respective calendar. In embodiments where the calendar request includes the time and/or date range, the received calendar data may indicate availability only for times and/or dates included in the time and/or date range.

In step 412, the processing unit 204 may determine if a single appointment time is requested by the primary user 104 or if multiple appointment times are requested. The determination may be made based on data included in the received appointment request, user preferences (e.g., stored in the originating user data entry 210), system preferences (e.g., stored in the memory 230), or any other suitable data source. If a single time is requested, then, in step 414, the processing unit 204 may identify an optimal appointment time in the time and/or date range based on the indicated availability of the primary user 104 and each of the invited other users 110 using the calendar data received from the calendar providers 106. The identification may be made via application of one or more algorithms stored in the memory 230 configured to maximize user availability.

In instances where multiple times may be identified where a maximum number of users are available, the processing unit 204 may identify an optimal time of the multiple times, which may be identified based on one or more additional considerations, such as preferences included in the appointment request, user preferences of the primary user 104 and/or the other users 110, availability surrounding the appointment time for each of the users, geographic location (e.g., proximity to other appointments in relation to travel time).

Once a time has been identified, then, in step 416, the processing unit 204 may determine if user confirmation of the appointment time by the primary user 104 is required. The determination may be made based on data included in the received appointment request and/or user preferences, such as may be stored in the originating user data entry 210. If user confirmation is requested, then the process 400 may proceed to step 420, where the transmitting unit 206 may transmit the identified optimal appointment time to the primary user 104 (e.g., to the user device 108 for display to the primary user 104) for confirmation.

If, in step 412, the processing unit 204 had determined that a single time was not requested by the primary user 104, then the process 400 may proceed to step 418, where the processing unit 204 may identify multiple appointment times. The appointment times may be within the time and/or date range and identified via application of the algorithms stored in the memory 230 to the calendar data received from the calendar providers 106 such that the availability of users for the appointment is maximized. Once the appointment times have been identified, then the process may proceed to step 420, where the transmitting unit 206 may transmit the identified appointment times to the primary user 104 for confirmation.

In step 422, the receiving unit 202 may receive confirmation from the primary user 104 (e.g., via the user device 108) for an appointment time. In instances where the primary user 104 was provided with a single, optimal appointment time (e.g., identified in step 414), the confirmation may be for approval or denial of that appointment time. In instances where the primary user 104 was provided with multiple appointment times (e.g., identified in step 418), the confirmation may be for approval of a specific appointment time, or denial of all appointment times. In step 424, the processing unit 204 may determine if an appointment time was confirmed or if the primary user 104 failed to confirm any suitable appointment time. If no appointment time was confirmed, then the process 400 may end. In some embodiments, the process may return to step 414 and/or 418 to identify alternative times.

If, in step 424, the processing unit 204 determines that the primary user 104 confirmed an appointment time for the appointment, then the process 400 may proceed to step 426. In step 426, the transmitting unit 206 may transmit a request to each of the calendar providers 106 associated with calendar data entries 306 in the originating user data entry 210 to block out the appointment time for the primary user 104 for the appointment length. In some embodiments, step 426 may also include the generation of an appointment data entry 214 for storage in the appointment database 212 for the appointment. In instances where the processing server 102 may store calendar data for the primary user 104, step 426 may include the updating of calendar data 218 in the calendar database 216 for the primary user to add the appointment.

In step 428, the processing unit 204 may determine If confirmation is required for the invited other users 110. The determination may be based on information in the received appointment request, preferences of the primary user 104, preferences of each respective other user 110, system preferences, etc. For instance, some other users 110 and/or the processing server 102 may prefer to block out an appointment prior to confirmation by the user, such that, in the event the user confirms attendance, the user may not have a conflicting appointment scheduled in the meantime.

If confirmation is required for an invited other user 110, then, in step 430, the transmitting unit 206 may transmit an appointment confirmation to the respective other user 110 (e.g., via an associated user device 112, identified via contact information 304 included in the associated invited user data entry 210). In step 432, the receiving unit 202 may receive a response from each of the other users 110 for whom confirmation was requested. In step 434, the transmitting unit 206 may transmit a request to each of the calendar providers 106 associated with calendar data entries 306 in the respective invitee user data entries 210 to block out the appointment time for the corresponding other user 110 for the appointment length. The request may be transmitted for other users 110 who confirmed the appointment as received in step 432, or for whom it was determined in step 428 that no confirmation was required.

Exemplary Method for Remote Management of Appointment Data

Figure 5:
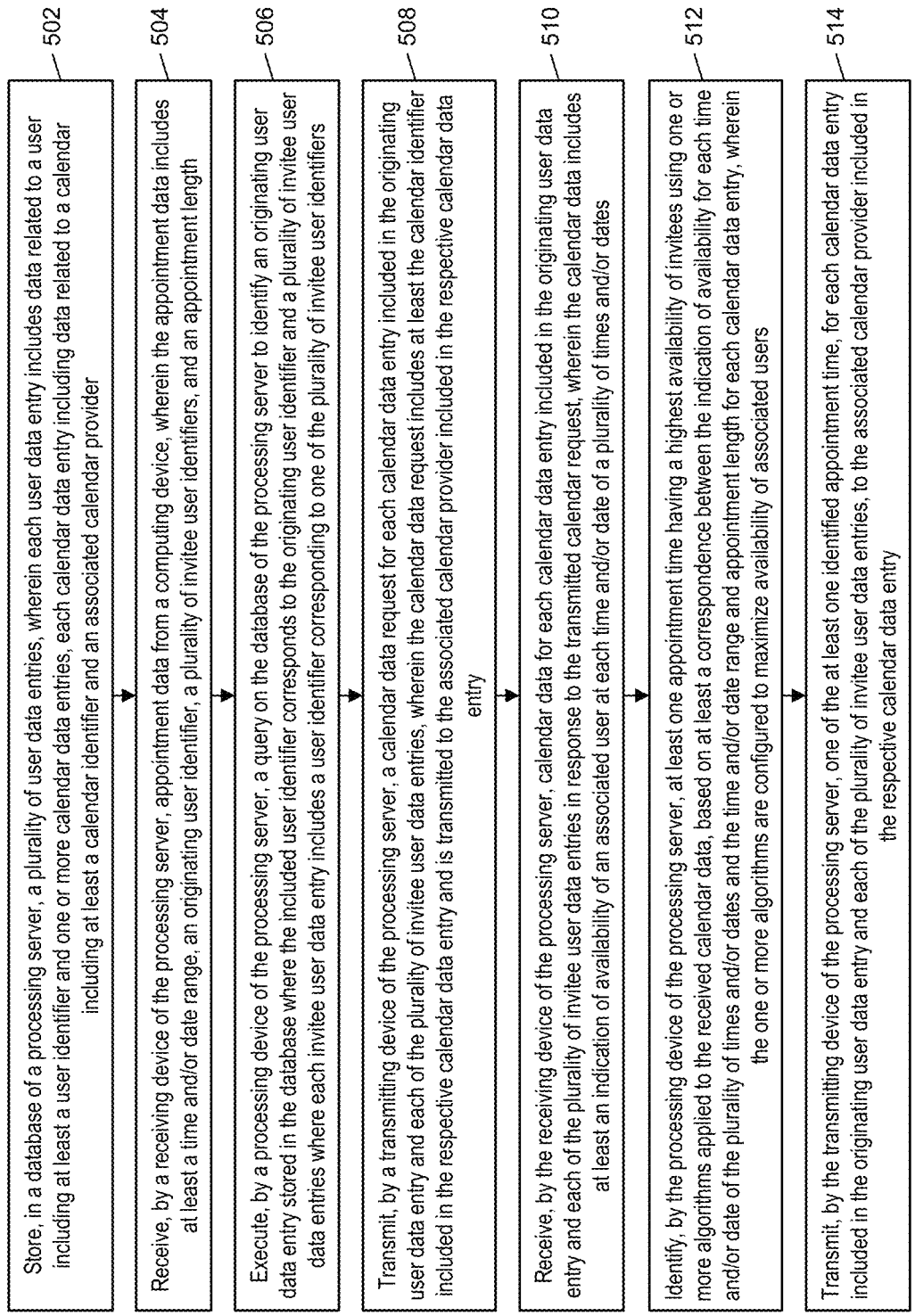
FIG. 5 is a flow chart illustrating an exemplary method for remote management of appointment data in accordance with exemplary embodiments.

FIG. 5 illustrates a method 500 for the remote management of appointment data including the consideration of calendar data for multiple users, each of whom may be associated with multiple calendars provided by a plurality of different calendar providers.

In step 502, a plurality of user data entries (e.g., user data entries 210) may be stored in a database (e.g., the user database 208) of a processing server (e.g., the processing server 102), wherein each user data entry 210 includes data related to a user including at least a user identifier (e.g., user identifier 302) and one or more calendar data entries (e.g., calendar data entries 306), each calendar data entry including data related to a calendar including at least a calendar identifier (e.g., calendar identifier 308) and an associated calendar provider (e.g., calendar provider 106 and/or 310). In step 504, appointment data may be received by a receiving device (e.g., the receiving unit 202) of the processing server from a computing device (e.g., the user device 108), wherein the appointment data includes at least a time and/or date range, an originating user identifier, a plurality of invitee user identifiers, and an appointment length. In one embodiment, the time and/or date range may include at least two dates.

In step 506, a query may be executed by a processing device (e.g., the processing unit 204) of the processing server on the database of the processing server to identify an originating user data entry stored in the database where the included user identifier corresponds to the originating user identifier and a plurality of invitee user data entries where each invitee user data entry includes a user identifier corresponding to one of the plurality of invitee user identifiers. In one embodiment, at least one invitee user data entry may include two or more calendar data entries, the two or more calendar data entries including at least two different calendar providers.

In step 508, a calendar data request may be transmitted by a transmitting device (e.g., the transmitting unit 206) of the processing device for each calendar data entry included in the originating user data entry and each of the plurality of invitee user data entries, wherein the calendar data request includes at least the calendar identifier included in the respective calendar data entry and is transmitted to the associated calendar provider included in the respective calendar data entry. In one embodiment, the calendar data request may be transmitted to at least two different calendar providers.

In step 510, calendar data may be received by the receiving device of the processing server for each calendar data entry included in the originating user data entry and each of the plurality of invitee user data entries in response to the transmitted calendar request, wherein the calendar data includes at least an indication of availability of an associated user at east time and/or date of a plurality of time and/or dates. In some embodiments, the calendar data request may further include the time and/or date range. In a further embodiment, the plurality of time and/or dates may correspond to the time and/or date range.

In step 512, at least one appointment time having a highest availability of invitees may be identified by the processing device of the processing server using one or more algorithms applied to the received calendar data, based on at least a correspondence between the indication of availability for each time and/or date of the plurality of times and/or dates and the time and/or date range and appointment length for each calendar data entry, wherein the one or more algorithms are configured to maximize availability of associated users. In one embodiment, the one or more algorithms may be stored in a memory (e.g., the memory 230) of the processing server. In step 514, one of the at least one identified appointment time may be transmitted by the transmitting device of the processing server, for each calendar data entry included in the originating user data entry and each of the plurality of invitee user data entries, to the associated calendar provider included in the respective calendar data entry.

In one embodiment, the method 500 may further include transmitting, by the transmitting device of the processing server, a confirmation message to the computing device, wherein the confirmation message includes at least the transmitted appointment time. In some embodiments, the method 500 may also include: transmitting, by the transmitting device of the processing server, each of the at least one identified appointment time to the computing device; and receiving, by the receiving device of the processing server, a selected appointment time of the at least one identified appointment time from the computing device, wherein the transmitted appointment time is the selected appointment time. In one embodiment, each user data entry may further include contact information, and the method 500 may further include transmitting, by the transmitting device of the processing server, a confirmation message to a computing device associated with each invitee user data entry based on the included contact information.

Computer System Architecture

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4 and 5.

In some embodiments, programmable logic may be used, and such logic may execute on a commercially available processing platform or special purpose device. A person having ordinary skill in the relevant art may appreciate that embodiments of the disclosed subject matter may be practiced with various computer system and/or device configurations that may include multi-core, multiprocessor systems, mini-computers, mainframe computers, computers linked or clustered with distributed functions, as well as pervasive computers that may be embedded into virtually any device. For instance, at least one processor device and a memory may be used to implement the above described embodiments.

The computer system 600 may include a processor 602. The processor 602 may be a single processor, a plurality of processors, or combinations thereof. The processor 602 may be comprised of one or more processor "cores." The processor 602 may be a general purpose processor or may be a special purpose processor specially configured to perform the functions discussed herein. The processor 602 may be connected to a communications infrastructure 604. The communications infrastructure 604 may be a bus, message queue, network, multi-core message-passing scheme, or other suitable type of communications infrastructure. The communications infrastructure 604 may communicate with the processor 602 and a plurality of additional components of the computer system 600 as illustrated in FIG. 6.

The computer system 600 may include a display interface 606. The display interface 606 may communicate with the communications infrastructure 604 and be configured to allow data to be transferred between the computer system 600 and one or more external display devices 608. Exemplary display interfaces 606 may include high-definition multimedia interface (HDMI), digital visual interface (DVI), video graphics array (VGA), etc. The display device 608 may be any suitable type of display for displaying data transmitted via the display interface 606 of the computer system 600, including a cathode ray tube (CRT) display, liquid crystal display (LCD), light-emitting diode (LED) display, capacitive touch display, thin film transistor (TFT) display, etc.

The computer system 600 may also include an input interface 610. The input interface 610 may communicate with the communications infrastructure 604 and be configured to allow data to be transferred between the computer system 600 and one or more input devices 612 that may receive input from users or systems. Exemplary input interfaces may include universal serial bus (USB), FireWire, Thunderbolt, PS/2, etc. Input devices 612 may include any suitable type of device for receiving input to provide to the computer system 600 via the input interface 610 including a keyboard, mouse, track pad, touch pad, touch display, microphone, click wheel, scroll wheel, camera, etc.

The computer system 600 may also include a communications interface 614. The communications interface 614 may communicate with the communications infrastructure 604 and be configured to allow data to be transferred between the computer system 600 and external computer systems and devices via one or more networks 616. Exemplary communication interfaces 614 may include a modem, network interface (e.g., an Ethernet card), a communications port, a PCMCIA slot and card, etc. Data that may be transferred via the communications interface 614 may be in the form of signals, which may be electronic, electromagnetic, optical, etc. The data may travel to the network 616, which may be any suitable type of network including a local area network (LAN), wire area network (WAN), a wireless network (e.g., WiFi), a mobile communication network, a cellular network, a satellite network, the Internet, a fiber optic network, a coaxial cable network, an infrared network, a radio frequency (RF) network, a combination thereof, etc.

The computer system 600 may also include memory 618. The memory 618 may communicate with the communications infrastructure 604 and be configured to store data for use by the components of the computer system 600 for the performing of functions disclosed herein and traditional functions associated with the respective computer system 600 components. The memory 618 may include one or more types of memory configured to store data suitable for use in performing the functions of the computer system 600. For instance, the memory 618 may include a hard disk drive 620. The hard disk drive 620 may utilize optical storage, magnetic storage, or other type of suitable storage media. Data stored in the hard disk drive 620 or in the memory 618 may be done using any suitable type of storage configuration or schema. The memory 618 may also include a solid state memory 622, and may include an interface 624 (e.g., which may be included in the computer system 600 separate from the memory 618 and accessed via the communications structure 604) that is configured to communicate with one or more external removable storage units 626. Removable storage units 626 may include any suitable type of storage including a floppy disk, magnetic tape, optical disk, flash memory, hard disk drive, solid state drive, cartridge, memory chip, etc.

The memory 618 may be configured to store computer programs, which may be executed by the processor 602 to implement the present methods discussed herein. In particular, the computer programs stored in the memory 618 and executed by the processor 602 may implement the methods illustrated in FIGS. 4 and 5, discussed above. Accordingly, such computer programs may represent controllers of the computer system 600. Where the present disclosure is implemented using software, the software may be stored in a computer program product and loaded into the computer system 600 via the network 616, removable storage unit 626, or other suitable method.

Techniques consistent with the present disclosure provide, among other features, systems and methods for remote management of appointment data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for remote management of appointment data, comprising:
    receiving, by a receiving device of a processing server, appointment data from a computing device, wherein the appointment data includes at least a time and/or date range, an originating user identifier, a plurality of invitee user identifiers, and an appointment length;
    initiating, by a transmitting device of the processing server, authentication of the processing server by transmitting an authentication request to a calendar provider associated with each of the plurality of invitee user identifiers, each authentication request including provider credentials for a respective calendar provider associated with each of the plurality of invitee user identifiers and a request for electronic calendar data associated with an electronic calendar data entry of each of the plurality of invitee user identifiers;
    receiving, by the receiving device of the processing server when the processing server has been successfully authenticated by at least one respective calendar provider, an authentication response, which includes the electronic calendar data for the electronic calendar data entry associated with each of the plurality of invitee user data entries, wherein the electronic calendar data includes at least an indication of availability of an associated user at each time and/or date of a plurality of times and/or dates, the electronic calendar data being received according to a communication protocol of the respective calendar provider associated with each invitee;
    identifying, by the processing device of the processing server, at least one appointment time having a highest availability of invitees using one or more algorithms applied to the received electronic calendar data, based on at least a correspondence between the indication of availability for each time and/or date of the plurality of times and/or dates and the time and/or date range and the appointment length for each calendar data entry, wherein the one or more algorithms are configured to maximize availability of associated users;
    transmitting, by the transmitting device of the processing server, one of the at least one identified appointment time, for each electronic calendar data entry included in the received electronic calendar data and associated with the user identifier, to a associated a respective calendar provider included in the respective electronic calendar data entry according to a communication protocol of the respective calendar provider;
    transmitting, by the transmitting device of the processing server, each of the at least one identified appointment time to the computing device without any of the plurality of time and/or dates not included in the at least one identified appointment time;
    receiving, by the receiving device of the processing server, a selected appointment time of the at least one identified appointment time from the computing device; and
    discarding, by the processing device of the processing server, the received electronic calendar data for each electronic calendar data entry such that the processing server does not retain the received electronic calendar data, wherein
    at least one invitee user data entry includes two or more electronic calendar data entries, the two or more electronic calendar data entries including at least two different calendar providers, and
    the transmitted appointment time is the selected appointment time.

2. The method of claim 1, further comprising:
    transmitting, by the transmitting device of the processing server, a confirmation message to the computing device, wherein the confirmation message includes at least the transmitted appointment time.

3. The method of claim 1, wherein each user data entry further includes contact information, and wherein the method further comprises:
    transmitting, by the transmitting device of the processing server, a confirmation message to a computing device associated with each invitee user data entry based on the included contact information.

4. The method of claim 1, wherein the authentication request is transmitted to the at least two different calendar providers.

5. The method of claim 1, wherein the authentication request further includes the time and/or date range of the electronic calendar data.

6. The method of claim 5, wherein the plurality of times and/or dates corresponds to the time and/or date range.

7. The method of claim 1, wherein the time and/or date range includes at least two dates.

8. The method of claim 1, further comprising:
    storing, in a memory of the processing server, the one or more algorithms.

9. A system for remote management of appointment data, comprising:
    a receiving device of the processing server configured to receive appointment data from a computing device, wherein the appointment data includes at least one time and/or date range, an originating user identifier, a plurality of invitee user identifiers, and an appointment length;

a processing device of the processing server configured to identify at least one appointment time having a highest availability of invitees using one or more algorithms applied to received electronic calendar data, based on at least a correspondence between an indication of availability for each time and/or date of the at least one time and/or date range and the appointment length for each calendar data entry, wherein the one or more algorithms are configured to maximize availability of associated users; and a transmitting device of the processing server configured to:
  initiate authentication of the processing server by transmitting an authentication request for electronic calendar data to a calendar provider associated with each of the plurality of invitee user identifiers, each authentication request including provider credentials for a respective calendar provider associated with each of the plurality of invitee user identifiers and a request for electronic calendar data associated with an electronic calendar data entry for invitee user data entries of each of the invitee user identifiers;
  transmit the at least one identified appointment times, for each electronic calendar data entry included in the originating user data entry and each of the plurality of invitee user data entries, to the respective calendar provider included in the respective electronic calendar data entry according to a communication protocol of the associated calendar provider, and
  transmit each of the at least one identified appointment time to the computing device without any of the plurality of time and/or dates not included in the at least one identified appointment time, wherein the receiving device of the processing server is further configured to receive, when the processing server has been successfully authenticated by at least one respective calendar provider, the electronic calendar data for an electronic calendar data entry associated with each of the plurality of invitee user data, wherein the electronic calendar data includes at least an indication of availability of an associated user at each time and/or date of a plurality of times and/or dates, the electronic calendar data being received according to a communication protocol of the respective calendar provider associated with each invitee;

the receiving device of the processing server is further configured to receive a selected appointment time of the at least one identified appointment time from the computing device, the processing device of the processing server is further configured to discard the received electronic calendar data for each electronic calendar data entry such that the processing server does not retain the received electronic calendar data, at least one invitee user data entry includes two or more electronic calendar data entries, the two or more electronic calendar data entries including at least two different calendar providers, and the transmitted appointment time is the selected appointment time.

10. The system of claim 9, wherein the transmitting device of the processing server is further configured to transmit a confirmation message to the computing device, wherein the confirmation message includes at least the selected appointment time.

11. The system of claim 9, wherein each user data entry further includes contact information, and the transmitting device of the processing server is further configured to transmit a confirmation message to a computing device associated with each invitee user data entry based on the included contact information.

12. The system of claim 9, wherein the authentication request is transmitted to at least two different calendar providers.

13. The system of claim 9, wherein the authentication request further includes the time and/or date range of the electronic calendar data.

14. The system of claim 13, wherein the plurality of times and/or dates corresponds to the time and/or date range.

15. The system of claim 9, wherein the time and/or date range includes at least two dates.

16. The system of claim 9, further comprising:
a memory of the processing server configured to store the one or more algorithms.

* * * * *